United States Patent
Eickhoff

(10) Patent No.: US 9,837,674 B2
(45) Date of Patent: *Dec. 5, 2017

(54) PRESSURE DIFFERENTIAL SLIDE VALVE FOR FUEL CELL

(71) Applicant: Honeywell International Inc., Morristown, NJ (US)

(72) Inventor: Steven J. Eickhoff, Brooklyn Park, MN (US)

(73) Assignee: Honeywell International Inc., Morris Plains, NJ (US)

( * ) Notice: Subject to any disclaimer, the term of this patent is extended or adjusted under 35 U.S.C. 154(b) by 501 days.

This patent is subject to a terminal disclaimer.

(21) Appl. No.: 14/446,965

(22) Filed: Jul. 30, 2014

(65) Prior Publication Data

US 2014/0342261 A1 Nov. 20, 2014

Related U.S. Application Data

(62) Division of application No. 11/606,758, filed on Nov. 30, 2006, now Pat. No. 8,822,097.

(51) Int. Cl.
*H01M 8/04* (2016.01)
*H01M 8/04082* (2016.01)
*H01M 8/04089* (2016.01)
*H01M 8/1018* (2016.01)

(52) U.S. Cl.
CPC ... *H01M 8/04201* (2013.01); *H01M 8/04089* (2013.01); *H01M 8/04208* (2013.01); *H01M 2008/1095* (2013.01)

(58) Field of Classification Search
None
See application file for complete search history.

(56) References Cited

U.S. PATENT DOCUMENTS

| | | | |
|---|---|---|---|
| 2,935,382 A | 5/1960 | Osborn et al. |
| 3,133,837 A | 5/1964 | Eidensohn |
| 3,765,946 A | 10/1973 | Werner et al. |
| 3,931,395 A | 1/1976 | Beckert et al. |
| 3,994,697 A | 11/1976 | Burke |
| 4,048,385 A | 9/1977 | Regnaut |
| 4,138,089 A | 2/1979 | McCarthy |
| 4,155,712 A | 5/1979 | Taschek |
| 4,261,955 A | 4/1981 | Bailey, Jr. et al. |

(Continued)

FOREIGN PATENT DOCUMENTS

EP 1845572 A1 10/2007
WO WO-2005/004273 A2 1/2005

(Continued)

OTHER PUBLICATIONS

"U.S. Appl. No. 11/592,692, Non Final Office Action dated Jan. 21, 2011", 8 pgs.

(Continued)

*Primary Examiner* — Barbara Gilliam
*Assistant Examiner* — Adam A Arciero
(74) *Attorney, Agent, or Firm* — Schwegman Lundberg & Woessner, P.A.

(57) ABSTRACT

A power generator includes a fuel container adapted to hold a hydrogen containing fuel. A sliding valve is coupled between a fuel cell and a fuel container. A pressure responsive actuator is coupled to the two stage valve and the fuel container.

7 Claims, 2 Drawing Sheets

(56) References Cited

U.S. PATENT DOCUMENTS

| | | | |
|---|---|---|---|
| 4,407,904 A | 10/1983 | Uozumi et al. |
| 4,476,196 A | 10/1984 | Poeppel et al. |
| 4,476,197 A | 10/1984 | Herceg |
| 4,596,748 A | 6/1986 | Katz et al. |
| 4,614,204 A | 9/1986 | Dolejs |
| 4,629,664 A | 12/1986 | Tsukui et al. |
| 4,659,559 A | 4/1987 | Struthers |
| 4,826,741 A | 5/1989 | Aldhart et al. |
| 4,857,420 A | 8/1989 | Maricle et al. |
| 4,872,472 A | 10/1989 | Lefevre et al. |
| 4,876,163 A | 10/1989 | Reichner |
| 4,906,536 A | 3/1990 | Simonton |
| 4,910,100 A | 3/1990 | Nakanishi et al. |
| 5,248,125 A | 9/1993 | Fritch et al. |
| 5,298,341 A | 3/1994 | Khandkar et al. |
| 5,346,777 A | 9/1994 | Namba et al. |
| 5,372,617 A | 12/1994 | Kerrebrock et al. |
| 5,443,616 A | 8/1995 | Congdon |
| 5,449,697 A | 9/1995 | Noaki et al. |
| 5,458,989 A | 10/1995 | Dodge |
| 5,534,363 A | 7/1996 | Sprouse et al. |
| 5,789,100 A | 8/1998 | Burroughs et al. |
| 5,804,329 A | 9/1998 | Amendola |
| 5,836,750 A | 11/1998 | Cabuz et al. |
| 5,849,046 A | 12/1998 | Bailey |
| 5,851,689 A | 12/1998 | Chen |
| 5,853,910 A | 12/1998 | Tomioka et al. |
| 5,861,221 A | 1/1999 | Ledjeff et al. |
| 5,914,200 A | 6/1999 | Schabert et al. |
| 5,948,558 A | 9/1999 | Amendola |
| 5,974,235 A | 10/1999 | Nunally et al. |
| 5,992,857 A | 11/1999 | Ueda et al. |
| 6,052,124 A | 4/2000 | Stein et al. |
| 6,054,234 A | 4/2000 | Weiss et al. |
| 6,093,501 A | 7/2000 | Werth |
| 6,127,058 A | 10/2000 | Pratt et al. |
| 6,179,986 B1 | 1/2001 | Swette et al. |
| 6,250,078 B1 | 6/2001 | Amendola et al. |
| 6,265,093 B1 | 7/2001 | Surampudi et al. |
| 6,268,076 B1 | 7/2001 | Dickmann et al. |
| 6,280,869 B1 | 8/2001 | Chen |
| 6,303,244 B1 | 10/2001 | Surampudi et al. |
| 6,307,605 B1 | 10/2001 | Bailey |
| 6,326,097 B1 | 12/2001 | Hockaday |
| 6,395,414 B1 | 5/2002 | Clingerman et al. |
| 6,406,808 B1 | 6/2002 | Pratt et al. |
| 6,413,665 B1 | 7/2002 | Blanchet et al. |
| 6,428,680 B1 | 8/2002 | Kreichauf |
| 6,432,566 B1 | 8/2002 | Condit et al. |
| 6,433,129 B1 | 8/2002 | Amendola et al. |
| 6,434,278 B1 | 8/2002 | Hashimoto |
| 6,468,694 B1 | 10/2002 | Amendola |
| 6,471,850 B2 | 10/2002 | Shiepe et al. |
| 6,483,275 B1 | 11/2002 | Nebrigic et al. |
| 6,497,973 B1 | 12/2002 | Amendola |
| 6,506,510 B1 | 1/2003 | Sioui et al. |
| 6,506,511 B1 | 1/2003 | Lakeman et al. |
| 6,508,195 B1 | 1/2003 | Tipaldo |
| 6,524,450 B1 | 2/2003 | Hara |
| 6,524,542 B2 | 2/2003 | Amendola et al. |
| 6,534,033 B1 | 3/2003 | Amendola et al. |
| 6,535,658 B1 | 3/2003 | Mendoza et al. |
| 6,541,149 B1 | 4/2003 | Maynard et al. |
| 6,544,679 B1 | 4/2003 | Petillo et al. |
| 6,582,842 B1 | 6/2003 | King |
| 6,586,563 B1 | 7/2003 | Ortega et al. |
| 6,596,236 B2 | 7/2003 | DiMeo, Jr. et al. |
| 6,610,193 B2 | 8/2003 | Schmitman |
| 6,620,542 B2 | 9/2003 | Pan |
| 6,632,554 B2 | 10/2003 | Doshi et al. |
| 6,638,654 B2 | 10/2003 | Jankowksi et al. |
| 6,645,651 B2 | 11/2003 | Hockaday et al. |
| 6,670,444 B2 | 12/2003 | Amendola et al. |
| 6,672,078 B2 | 1/2004 | Ovshinsky et al. |
| 6,683,025 B2 | 1/2004 | Amendola et al. |
| 6,706,909 B1 | 3/2004 | Snover et al. |
| 6,727,012 B2 | 4/2004 | Chen et al. |
| 6,728,422 B1 | 4/2004 | Weiss |
| 6,760,488 B1 | 7/2004 | Moura et al. |
| 6,801,136 B1 | 10/2004 | Goodman et al. |
| 6,804,949 B2 | 10/2004 | Andrews et al. |
| 6,833,207 B2 | 12/2004 | Joos et al. |
| 6,844,100 B2 | 1/2005 | Bourgeois et al. |
| 6,852,436 B2 | 2/2005 | Badding et al. |
| 6,866,806 B2 | 3/2005 | Andrews et al. |
| 6,932,847 B2 | 8/2005 | Amendola et al. |
| 6,939,529 B2 | 9/2005 | Strizki et al. |
| 6,942,941 B2 | 9/2005 | Blunk et al. |
| 6,950,030 B2 | 9/2005 | Kovarik et al. |
| 6,953,009 B2 | 10/2005 | Reinke et al. |
| 6,977,123 B1 | 12/2005 | Burroughs et al. |
| 6,979,508 B2 | 12/2005 | Gurin et al. |
| 7,001,681 B2 | 2/2006 | Wood |
| 7,019,105 B2 | 3/2006 | Amendola et al. |
| 7,049,024 B2 | 5/2006 | Leban |
| 7,073,368 B2 | 7/2006 | Wood et al. |
| 7,083,657 B2 | 8/2006 | Mohring et al. |
| 7,105,033 B2 | 9/2006 | Strizki et al. |
| 7,108,777 B2 | 9/2006 | Xu et al. |
| 7,128,997 B2 | 10/2006 | Harding et al. |
| 7,322,205 B2 | 1/2008 | Bourne et al. |
| 7,367,334 B2 | 5/2008 | Faison, Jr. et al. |
| 7,524,342 B2 | 4/2009 | Brinkley, III |
| 7,527,885 B2 | 5/2009 | Toukura |
| 7,691,527 B2 | 4/2010 | Petillo et al. |
| 7,807,131 B2 | 10/2010 | Eickhoff |
| 8,283,079 B2 | 10/2012 | Eickhoff et al. |
| 8,557,479 B2 | 10/2013 | Eickhoff et al. |
| 8,822,097 B2* | 9/2014 | Eickhoff ........... H01M 8/04089 429/408 |
| 2001/0028973 A1 | 10/2001 | Ong et al. |
| 2002/0068213 A1 | 6/2002 | Kaiser et al. |
| 2002/0114983 A1 | 8/2002 | Frank et al. |
| 2002/0154310 A1 | 10/2002 | DiMeo, Jr. et al. |
| 2002/0177031 A1 | 11/2002 | Doshi et al. |
| 2003/0009942 A1 | 1/2003 | Amendola et al. |
| 2003/0044656 A1 | 3/2003 | Wood |
| 2003/0054215 A1 | 3/2003 | Doshi et al. |
| 2003/0157018 A1 | 8/2003 | Zaluski et al. |
| 2003/0235728 A1 | 12/2003 | Van Zee et al. |
| 2004/0009379 A1 | 1/2004 | Amendola et al. |
| 2004/0011662 A1 | 1/2004 | Xu et al. |
| 2004/0033194 A1 | 2/2004 | Amendola et al. |
| 2004/0035054 A1 | 2/2004 | Mohring et al. |
| 2004/0047801 A1 | 3/2004 | Petillo et al. |
| 2004/0052723 A1 | 3/2004 | Jorgensen |
| 2004/0053100 A1 | 3/2004 | Stanley et al. |
| 2004/0101740 A1 | 5/2004 | Sanders |
| 2004/0120889 A1 | 6/2004 | Shah et al. |
| 2004/0148857 A1 | 8/2004 | Strizki et al. |
| 2004/0161646 A1 | 8/2004 | Rezachek et al. |
| 2004/0191152 A1 | 9/2004 | Amendola et al. |
| 2004/0202903 A1 | 10/2004 | DeVos |
| 2004/0209133 A1* | 10/2004 | Hirsch ............ H01M 8/04089 429/444 |
| 2004/0215407 A1 | 10/2004 | Thielman et al. |
| 2005/0022883 A1 | 2/2005 | Adams et al. |
| 2005/0079128 A1 | 4/2005 | DeVos et al. |
| 2005/0118469 A1 | 6/2005 | Leach et al. |
| 2005/0132640 A1 | 6/2005 | Kelly et al. |
| 2005/0135996 A1 | 6/2005 | Ortega et al. |
| 2005/0136300 A1 | 6/2005 | Dyer |
| 2005/0142410 A1 | 6/2005 | Higashi et al. |
| 2005/0155668 A1* | 7/2005 | Finkelshtain ...... H01M 8/04186 141/67 |
| 2005/0158595 A1* | 7/2005 | Marsh ................. B01J 7/02 48/61 |
| 2005/0166812 A1 | 8/2005 | Noll et al. |
| 2005/0181245 A1 | 8/2005 | Bonne et al. |
| 2005/0199546 A1 | 9/2005 | Rusta-Sallehy et al. |
| 2005/0238573 A1 | 10/2005 | Zhang et al. |
| 2005/0249993 A1 | 11/2005 | Horiuchi et al. |
| 2005/0260461 A1 | 11/2005 | Wood et al. |
| 2005/0262924 A1 | 12/2005 | Wood et al. |

(56) References Cited

U.S. PATENT DOCUMENTS

| | | | |
|---|---|---|---|
| 2005/0268555 A1 | 12/2005 | Amendola | |
| 2005/0276746 A1 | 12/2005 | Zhang et al. | |
| 2006/0014059 A1 | 1/2006 | Wood | |
| 2006/0021279 A1 | 2/2006 | Mohring et al. | |
| 2006/0040152 A1 | 2/2006 | Wood | |
| 2006/0045228 A1 | 3/2006 | Shiao et al. | |
| 2006/0102489 A1 | 5/2006 | Kelly | |
| 2006/0102491 A1 | 5/2006 | Kelly et al. | |
| 2006/0108000 A1 | 5/2006 | Kaneko et al. | |
| 2006/0127722 A1 | 6/2006 | Nakajima et al. | |
| 2006/0134485 A1 | 6/2006 | Horiuchi et al. | |
| 2006/0144701 A1 | 7/2006 | Kelly | |
| 2006/0174952 A1* | 8/2006 | Curello | C01B 3/065 137/614.03 |
| 2006/0210850 A1 | 9/2006 | Abouatallah et al. | |
| 2006/0234093 A1 | 10/2006 | Schaefer et al. | |
| 2006/0261349 A1 | 11/2006 | Doering et al. | |
| 2007/0026282 A1 | 2/2007 | Kumagai et al. | |
| 2007/0104996 A1 | 5/2007 | Eickhoff et al. | |
| 2007/0105008 A1 | 5/2007 | Gu et al. | |
| 2007/0141440 A1 | 6/2007 | Yang et al. | |
| 2007/0184312 A1 | 8/2007 | Eickhoff | |
| 2007/0190400 A1 | 8/2007 | Buche et al. | |
| 2007/0217994 A1 | 9/2007 | Amendola et al. | |
| 2007/0237995 A1* | 10/2007 | Eickhoff | C01B 3/065 429/421 |
| 2007/0259227 A1 | 11/2007 | Oishi et al. | |
| 2007/0269698 A1 | 11/2007 | Gu | |
| 2007/0271844 A1 | 11/2007 | Mohring et al. | |
| 2007/0275291 A1 | 11/2007 | Gu et al. | |
| 2007/0277870 A1 | 12/2007 | Wechsler | |
| 2007/0287059 A1 | 12/2007 | Eickhoff et al. | |
| 2008/0003484 A1 | 1/2008 | Chen et al. | |
| 2008/0057378 A1 | 3/2008 | Kang et al. | |
| 2008/0090129 A1 | 4/2008 | Kunz et al. | |
| 2008/0107930 A1 | 5/2008 | Eickhoff et al. | |
| 2008/0124609 A1 | 5/2008 | Sasahara et al. | |
| 2008/0160383 A1 | 7/2008 | Shen et al. | |
| 2008/0199740 A1 | 8/2008 | Giddey et al. | |
| 2008/0220300 A1 | 9/2008 | Jones et al. | |
| 2008/0241635 A1 | 10/2008 | Sato et al. | |
| 2008/0268299 A1 | 10/2008 | Eickhoff et al. | |
| 2008/0274393 A1 | 11/2008 | Markoski et al. | |
| 2008/0280169 A1 | 11/2008 | Niu et al. | |
| 2008/0280183 A1 | 11/2008 | Eun et al. | |
| 2009/0113795 A1 | 5/2009 | Eickhoff | |
| 2009/0236551 A1 | 9/2009 | Nomichi et al. | |
| 2010/0151283 A1 | 6/2010 | Eickhoff | |
| 2010/0151346 A1 | 6/2010 | Eickhoff | |
| 2011/0003237 A1 | 1/2011 | Eickhoff et al. | |

FOREIGN PATENT DOCUMENTS

| | | |
|---|---|---|
| WO | WO-2006/113469 A1 | 10/2006 |
| WO | WO-2007/134095 A2 | 11/2007 |

OTHER PUBLICATIONS

"U.S. Appl. No. 11/592,692, Non Final Office Action dated Jul. 19, 2011", 12 pgs.
"U.S. Appl. No. 11/592,692, Non-Final Office Action dated Jul. 23, 2010", 9 pgs.
"U.S. Appl. No. 11/592,692, Notice of Allowance dated May 31, 2012", 6 pgs.
"U.S. Appl. No. 11/592,692, Preliminary Amendment filed Nov. 3, 2006", 3 pgs.
"U.S. Appl. No. 11/592,692, Response filed Apr. 18, 2011 to Non Final Office Action dated Jan. 21, 2011", 8 pgs.
"U.S. Appl. No. 11/592,692, Response filed Apr. 28, 2010 to Restriction Requirement dated Mar. 31, 2010", 7 pgs.
"U.S. Appl. No. 11/592,692, Response filed Oct. 19, 2011 to Non Final Office Action dated Jul. 19, 2011", 8 pgs.
"U.S. Appl. No. 11/592,692, Response filed Oct. 25, 2010 to Non Final Office Action dated Jul. 23, 2010", 9 pgs.
"U.S. Appl. No. 11/592,692, Response to Rule 312 Amendment dated Sep. 5, 2012", 2 pgs.
"U.S. Appl. No. 11/592,692, Restriction Requirement dated Mar. 31, 2010", 6 pgs.
"U.S. Appl. No. 11/606,758, Advisory Action dated Mar. 14, 2014", 3 pgs.
"U.S. Appl. No. 11/606,758, Examiner Interview Summary dated Mar. 25, 2010", 2 pgs
"U.S. Appl. No. 11/606,758, Final Office Action dated Jun. 10, 2009", 10 pgs.
"U.S. Appl. No. 11/606,758, Final Office Action dated Jun. 24, 2011", 10 pgs.
"U.S. Appl. No. 11/606,758, Final Office Action dated Sep. 15, 2010", 9 pgs.
"U.S. Appl. No. 11/606,758, Final Office Action dated Dec. 19, 2013", 12 pgs.
"U.S. Appl. No. 11/606,758, Non Final Office Action dated May 14, 2013", 13 pgs.
"U.S. Appl. No. 11/606,758, Non-Final Office Action dated Mar. 25, 2010", 11 pgs.
"U.S. Appl. No. 11/606,758, Non-Final Office Action dated May 12, 2008", 13 pgs.
"U.S. Appl. No. 11/606,758, Non-Final Office Action dated Nov. 13, 2009", 11 pgs.
"U.S. Appl. No. 11/606,758, Non-Final Office Action dated Nov. 24, 2008", 10 pgs.
"U.S. Appl. No. 11/606,758, Notice of Allowance dated Apr. 25, 2014", 14 pgs.
"U.S. Appl. No. 11/606,758, Response filed Jan. 4, 2010 to Non Final Office Action dated Nov. 13, 2009", 12 pgs.
"U.S. Appl. No. 11/606,758, Response filed Feb. 7, 2008 to Restriction Requirement dated Jan. 7, 2008", 6 pgs.
"U.S. Appl. No. 11/606,758, Response filed Feb. 17, 2014 to Final Office Action dated Dec. 19, 2013", 11 pgs.
"U.S. Appl. No. 11/606,758, Response filed Feb. 24, 2009 to Non Final Office Action dated Nov. 24, 2008", 9 pgs.
"U.S. Appl. No. 11/606,758, Response filed Jun. 21, 2010 to Non Final Office Action dated Mar. 25, 2010", 12 pgs.
"U.S. Appl. No. 11/606,758, Response filed Aug. 12, 2008 to Non-Final Office Action dated May 12, 2008", 11 pgs.
"U.S. Appl. No. 11/606,758, Response filed Aug. 14, 2013 to Non Final Office Action dated May 14, 2013", 12 pgs.
"U.S. Appl. No. 11/606,758, Response filed Aug. 17, 2011 to Final Office Action dated Jun. 24, 2011", 14 pgs.
"U.S. Appl. No. 11/606,758, Response filed Sep. 10, 2009 to Final Office Action dated Jun. 10, 2009", 12 pgs.
"U.S. Appl. No. 11/606,758, Response filed Nov. 10, 2010 to Final Office Action dated Sep. 15, 2010", 13 pgs.
"U.S. Appl. No. 11/606,758, Restriction Requirement dated Jan. 7, 2008", 6 pgs.
"U.S. Appl. No. 12/829,082, Response filed Oct. 31, 2012 to Non Final Office Action dated Sep. 24, 2012", 11 pgs.
"U.S. Appl. No. 12/829,082, Advisory Action dated Mar. 4, 2013", 3 pgs.
"U.S. Appl. No. 12/829,082, Final Office Action dated Dec. 20, 2012", 9 pgs.
"U.S. Appl. No. 12/829,082, Non Final Office Action dated Sep. 24, 2012", 9 pgs.
"U.S. Appl. No. 12/829,082, Notice of Allowance dated May 20, 2013", 9 pgs.
"U.S. Appl. No. 12/829,082, Preliminary Amendment filed Jul. 1, 2010", 5 pgs.
"U.S. Appl. No. 12/829,082, Response filed Feb. 20, 2013 to Final Office Action dated Dec. 20, 2012", 10 pgs.
"European Application Serial No. 07854813.8, Response and Amendment filed Nov. 6, 2012 to Examiner Consultation dated Nov. 6, 2012", 6 pgs.
"European Application Serial No. 07854813.8, Office Action dated Feb. 9, 2011", 5 pgs.
"European Application Serial No. 07854813.8, Office Action dated Dec. 21, 2011", 4 pgs.

(56) References Cited

OTHER PUBLICATIONS

"European Application Serial No. 07854813.8, Response filed Apr. 13, 2012 to Office Action dated Dec. 21, 2012", 6 pgs.
"European Application Serial No. 07854813.8, Response filed Jun. 9, 2011 to Office Action dated Feb. 9, 2011", 7 pgs.
"International Application Serial No. PCT/US2007/085766, International Preliminary Report on Patentability dated Jun. 3, 2009", 6 pgs.
"International Application Serial No. PCT/US2007/085766, International Search Report dated Apr. 2, 2008", 4 pgs.
"International Application Serial No. PCT/US2007/085766, Written Opinion dated Apr. 2, 2008", 6 pgs.
Pasaogullari, Ugur, "Liquid Water Transport in Polymer Electrolyte Fuel Cells with Multi-Layer Diffusion Media", *Proceedings of IMECE04. 2004 ASME International Mechanical Engineering Congress and Exposition*, Anaheim, California, (Nov. 13-20, 2004), 1-9.

\* cited by examiner

PRESSURE DIFFERENTIAL SLIDE VALVE FOR FUEL CELL

CROSS REFERENCE TO RELATED APPLICATIONS

The present application is a divisional of and claims priority to U.S. patent application Ser. No. 11/606,758, filed on Nov. 30, 2006, which application is incorporated herein by reference in its entirety.

BACKGROUND

In some fuel cell based power generators, hydrogen is extracted from a fuel in the presence of water and then is introduced into a fuel cell to produce electricity. Power generators based on hydrogen generators and proton exchange membrane (PEM) fuel cells may contain valves to control the rate at which electricity is generated. Such valves may require precision parts and be very expensive to provide adequate seals when closed. There is a need for a valve that can better control the flow of water, hydrogen and/or oxygen.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

Figure 1:
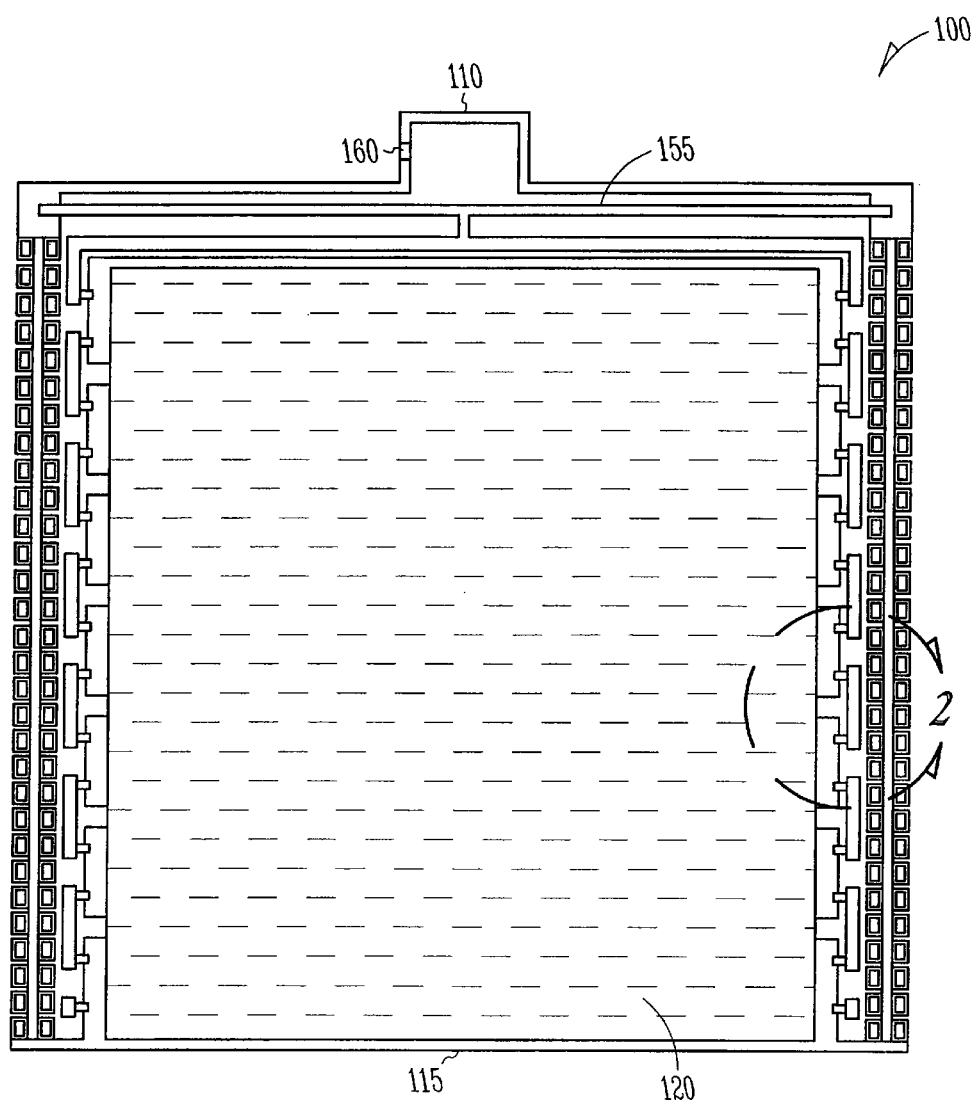
FIG. 1 is a cross section representation of a fuel cell based power generator having a slide valve according to an example embodiment.
Figure 2:
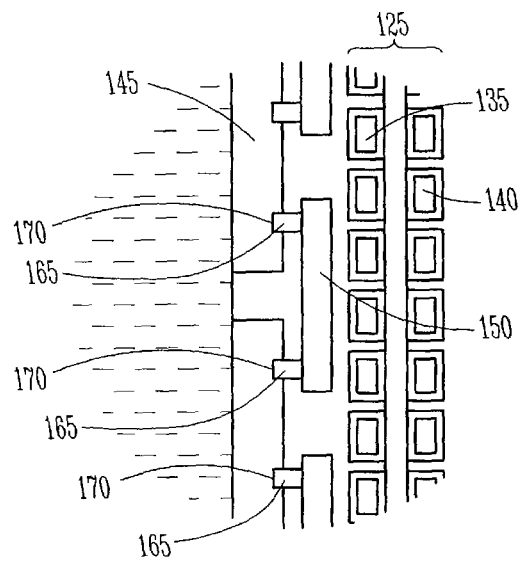
FIG. 2 is a cross section of a portion of the power generator of FIG. 1 illustrating a slide valve and fuel cell stack according to an example embodiment.

FIG. 1 is a cross section representation of a fuel cell based power generator 100 according to an example embodiment. Generator 100 includes a cathode output electrode 110 and an anode output electrode 115. In one embodiment, the generator may be shaped similar to a commercially available dry cell battery, such that it can be substituted for the dry cell battery. A fuel chamber 120 may contain a hydrogen containing fuel that provides hydrogen to a fuel cell stack 125, which is shown in expanded form in FIG. 2, wherein the numbering is consistent with FIG. 1.

Fuel cell stack 125 may include a proton exchange membrane (PEM), catalyst layer, gas diffusion layer, micro porous layer. An anode electrode 135 is coupled to the fuel cell stack 125 between the fuel cell stack 125 and the fuel chamber 120. It is also coupled to the anode output electrode 115. A cathode electrode 140 is coupled to the other side of the fuel cell stack, and is coupled to the cathode output electrode 110. It may also be exposed to ambient conditions.

Between the fuel cell 125 and the hydrogen chamber 120 is a slide valve. The slide valve includes a fixed plate 145 and a movable plate 150 that are coupled in a sliding relationship in one embodiment. A hydrogen and water vapor permeable particulate filter may also be used between the fuel cell and the fuel or fuel chamber 120. In one embodiment, the fixed plate 145 is supported in fixed position proximate or adjacent to the fuel chamber 120, and the movable plate 150 is coupled to a flexible diaphragm 155, that flexes in response to changes in pressure between the hydrogen pressure in the fuel chamber and ambient pressure. A hole 160 provides the diaphragm access to atmospheric pressure. The diaphragm 155 acts as a pressure responsive actuator that controls the slide valve. Each of the fixed plate 145 and movable plate 150 has openings that prevent flow when in a closed position and allow flow when the openings at least partially line up.

In one embodiment the valve responds to a pressure differential between ambient and the inside of the power generator. The fuel cell stack 125 is exposed at a desired pressure differential between hydrogen in the fuel container 120 and ambient.

In one embodiment the power generator is cylindrical in shape and the valve plates are concentric cylinders having mating holes. Fixed plate 145 and movable plate 150 correspond to an inner cylinder and an outer cylinder respectively. When a pressure differential exists across the membrane 155 such as when hydrogen pressure is greater than ambient pressure, the membrane 155 deflects and moves the outer cylinder 150 axially relative to the inner cylinder. The movement of the outer cylinder relative to the inner cylinder causes the holes to become misaligned, which closes the valve.

In one embodiment, o-rings 165 may be used between the plates or cylinders to provide sealing when the holes are misaligned. In one embodiment, the o-rings 165 are disposed within annular grooves 170 on the inner cylinder or fixed plate 145. The o-rings 165 seal against the inside of the outer cylinder or movable plate 150 to seal the cylinders when the holes are misaligned, corresponding to the valve being closed. This provides a substantially sealed closed valve position. When substantially sealed, the conductance of the valve is approximately 1% or less than the fully open conductance.

In one embodiment, the o-rings 165 may be formed of a compressible material and may reside substantially within the annular grooves 170. The compressibility of the material may minimize the effects of variations in size of the plates occurring during normal manufacturing. Nitrile, fluoroelastomers, Ethylene-Propylene, Copolymer of tetrafluoroethylene and propylene, FEP, PFA. O-ring cross section can be circular or rectangular. Wear rings or glide rings may also be used.

The plates in one embodiment are as thin as possible to maintain high conductance, while maintaining sufficient structural rigidity to move without collapse. Thicker sections on the perimeter of the outer plate running parallel to the direction of movement of the valve may be used to improve structural rigidity while maintaining high conductance. Likewise for the inner plate, where thicker sections may be on the inner diameter. O-rings may also have a small cross section in one embodiment to achieve high conductance, while maintaining a good seal between plates.

Figure 3:
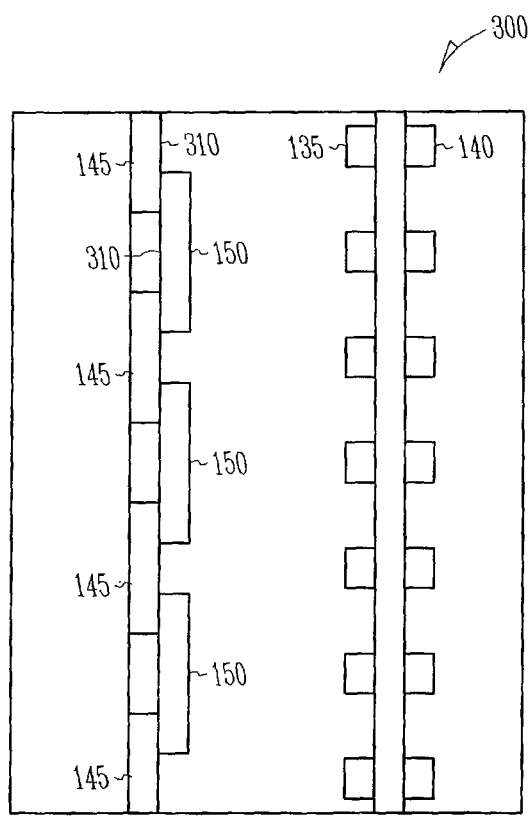
FIG. 3 is a cross section of a portion of the power generator illustrating an alternative slide valve and fuel cell stack according to an example embodiment.

Other shaped plates may also be used, and may generally conform to the shape of the fuel container and fuel cell. The valve plates may alternatively form a low friction contact fit in one embodiment as illustrated at 300 in FIG. 3 to enable relative movement or sliding. An o-ring need not be used in this embodiment. A lubricant 310 may be used to reduce stiction between the plates. As illustrated, the lubricant is at least on the outside of the fixed plate 145 and the inside of the moveable plate 150 where the plates contact each other. The outer dimensions, such as diameter of the fixed plate 145 is very close to the dimensions of the inner dimensions of the moveable plate 150 to form the friction fit.

Material combinations should have low coefficient of friction, for example stainless steel for the outer electrode and Teflon filled acetal for the inner electrode. Many other combinations that provide similar characteristics may be used.

In another embodiment, the outer plate could have a cut in the side, with an inside diameter slightly smaller than the outer diameter of the inner plate, such that the outer plate is expanded slightly when placed over the inner plate, and maintains a sealing force against the inner plate (or o-rings). Additionally, the outer plate could be flexible (rubber) and the inner plate rigid (stainless steel) and as discussed above, the inner diameter of the outer plate could be slightly smaller than the outer diameter of the inner plate, creating a sealing force as the outer plate expands to accommodate the inner plate.

The lubricant may also operate as a sealant. In one embodiment, the lubricant may be graphite or silicon or other lubricant compatible with materials used and the electrochemical reactions occurring. Oil or other hydrocarbon lubricants may also be used.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:

1. A method comprising:
   supplying hydrogen to a fuel cell in response to power demand;
   moving a sliding valve responsive to a pressure differential between a hydrogen supply and ambient to provide an open valve position, the sliding valve including:
   a cylindrical inner plate;
   a cylindrical outer plate coupled in a coaxial sliding relationship to the cylindrical inner plate;
   a plurality of o-rings seated in annular grooves around the cylindrical inner plate, wherein the cylindrical inner plate and cylindrical outer plate are sized to maintain a sealing force against the o-rings; and
   moving the sliding valve responsive to the pressure differential to provide a substantially sealed closed valve position.

2. The method of claim 1 wherein the cylindrical inner plate and cylindrical outer plate include two coaxial lubricated friction fit cylinders.

3. The method of claim 1, further including receiving hydrogen in the fuel cell from a fuel container.

4. The method of claim 1, wherein moving the sliding valve to provide an open valve position includes aligning a plurality of alignable holes in the sliding valve.

5. The method of claim 1, wherein moving the sliding valve to provide a substantially sealed closed valve position includes causing the plurality of alignable holes to be misaligned.

6. The method of claim 5, wherein:
   the sliding valve includes a cylindrical inner plate, a cylindrical outer plate disposed around the cylindrical inner plate, and at least one o-ring disposed in at least one annular groove on an outer surface of the inner plate; and
   wherein moving the sliding valve to provide a substantially sealed closed valve position includes sliding at least a portion of the cylindrical outer plate off of at least one o-ring.

7. The method of claim 1, further including filtering particulates through a hydrogen and water vapor permeable particulate filter positioned between the sliding valve and the fuel cell.

\* \* \* \* \*